No. 792,935. PATENTED JUNE 20, 1905.
T. E. & S. R. SIKES.
DEVICE FOR CONTRACTING THE DISCHARGE ENDS OF BALING PRESSES.
APPLICATION FILED SEPT. 19, 1903.
2 SHEETS—SHEET 1.
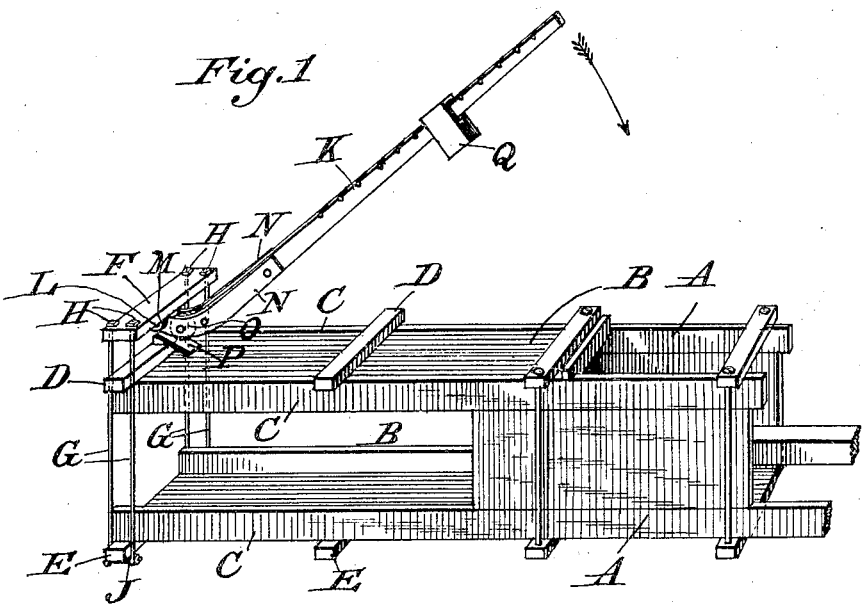
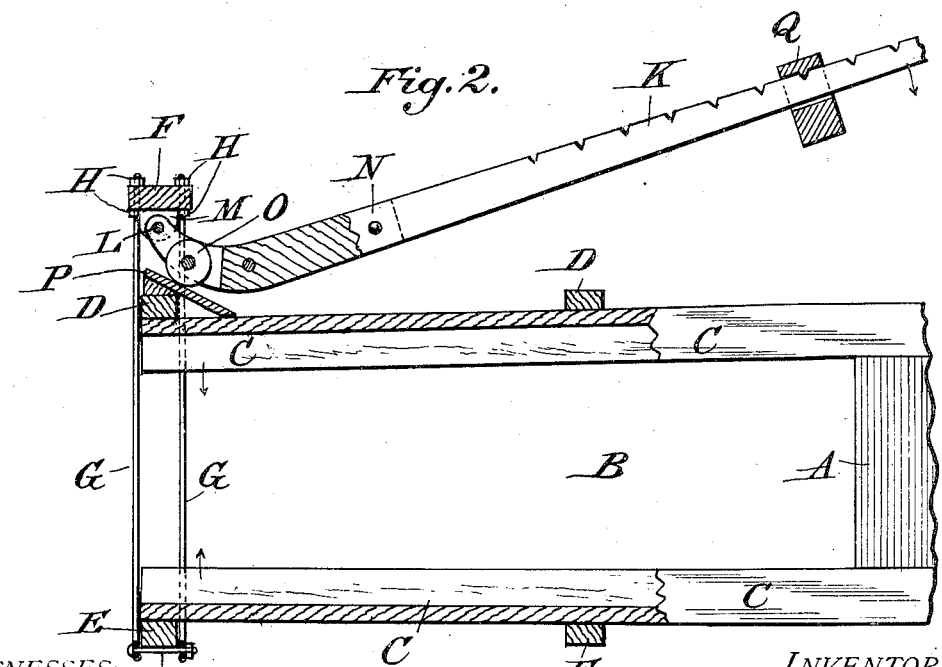
WITNESSES:
F. H. Schott
J. D. Kluge
INVENTORS
Thomas E. Sikes
Simon R. Sikes
BY
Attorney

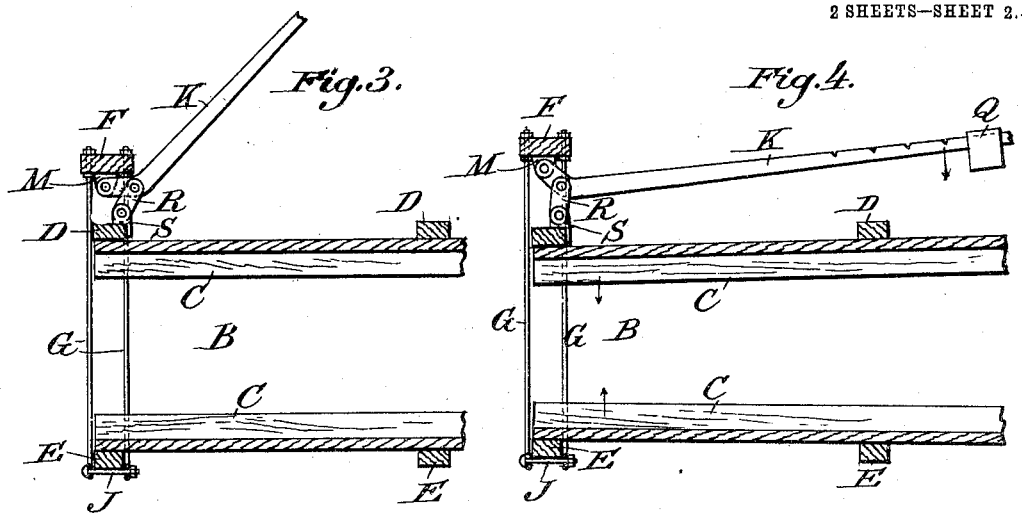
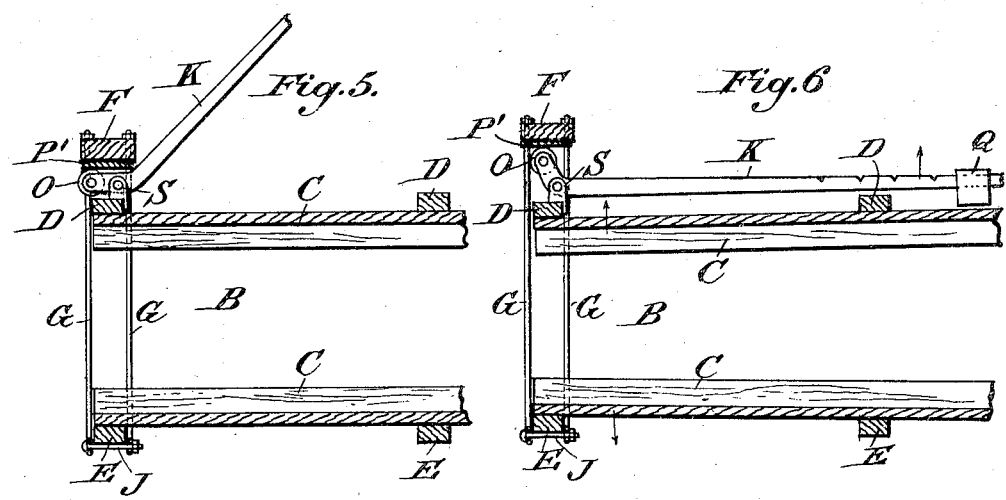
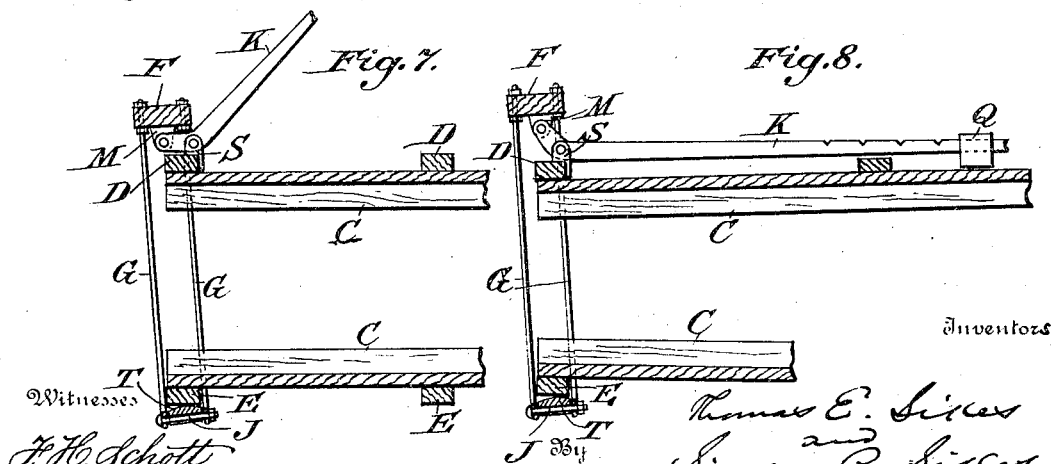

No. 792,935. Patented June 20, 1905.

UNITED STATES PATENT OFFICE.

THOMAS EUGENE SIKES AND SIMEON R. SIKES, OF HELENA, GEORGIA.

DEVICE FOR CONTRACTING THE DISCHARGE ENDS OF BALING-PRESSES.

SPECIFICATION forming part of Letters Patent No. 792,935, dated June 20, 1905.

Application filed September 19, 1903. Serial No. 173,835.

*To all whom it may concern:*

Be it known that we, THOMAS EUGENE SIKES and SIMEON R. SIKES, citizens of the United States, residing at Helena, in the county of Telfair and State of Georgia, have invented certain new and useful Improvements in Devices for Contracting the Discharge Ends of Baling-Presses; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to baling-presses, and more particularly to means for contracting the discharge end of the baling-press chamber, whereby the bales may be formed of a predetermined uniform density; and the invention has for its object to provide simple leverage means which may be readily applied to presses of ordinary construction for contracting the discharge end of the baling-chamber, so as to obtain the uniform density of the bale determined upon; also, to provide a construction in which the density of the bale will be automatically regulated under variation in the conditions of the material being baled and in the manner of feeding the press with the material.

To the accomplishment of the foregoing and such other objects as may hereinafter appear, the invention consists in the construction and in the combination of parts hereinafter particularly described and then sought to be clearly defined by the claims, reference being had to the accompanying drawings, in which—

Figure 1 represents so much of a hay-baling press as is necessary to illustrate the application of the invention, the contracting device being shown as applied thereto. Fig. 2 is a longitudinal section through Fig. 1, showing the lever depressed. Fig. 3 is a vertical section through a portion of the baling-chamber, showing a modified form of the invention with the lever in its normal position. Fig. 4 is a similar section showing the lever in its depressed position. Figs. 5 and 6 are similar views of another modification, and Figs. 7 and 8 are like views of another modification.

In the drawings, the letter A designates the baling-box, and the letter B the baling-chamber, the latter being formed of the longitudinal sills or timbers C and the cross-beams D, extending across the top of the baling-chamber, and E, extending across the bottom of the baling-chamber, all of which may be as found in baling-presses of any of the well-known types in use.

The weight or density of the bale is determined by the friction or compression exerted transversely thereon by the walls of the baling-chamber, and by contracting, more or less, the discharge end of the baling-chamber greater or less pressure is exerted on the bale, so as to determine or regulate the density of the bale. Our purpose is to provide simple leverage means by which the discharge end of the baling-chamber may be contracted more or less and which can be readily applied to baling-presses already in use without necessitating a special construction of baling-chamber for the purpose, and, further, to provide means by which a uniform pressure will be automatically controlled under varying conditions of the material being baled and upon variations that may exist in the manner of feeding the material, so that under such variations the density of the bale will be uniform. For that purpose we provide a cross-beam F, provided at opposite ends with means for attaching it to the discharge end of the baling-chamber, said means preferably being straps or rods G, attached at one end to the cross-beam F and at the other end to a portion of the bottom of the baling-chamber, the drawings for purposes of illustration showing two rods at each end of the cross-beam F, which at their upper ends pass through the cross-beam and are held thereto by nuts H, and each pair of rods connected together at their lower ends by bolts J, which bear against the under side of the projecting ends of one of the cross-beams E, which extend across the bottom of the baling-chamber, and the projecting ends of one of the cross-beams D to the top of the baling-chamber are represented as fitting freely between the rods G at each end of the cross-beam F of the attachment. While this is a simple and efficient means for connecting the attachment to the baling-chamber, yet we are not restricted in our invention to such particular means for securing the attachment to the baling-chamber. To the cross-beam F, preferably to its under side, is pivotally connected the short arm of a bent or elbow lever K, for instance, by means of a pivot-pin L, passed through the end of the short arm of the lever and through ears M, attached to the cross-beam F. This end of the lever is curved or bent upwardly at an angle of about forty-five degrees, more or less, and normally resting upon the top of the baling-chamber or a part thereof serves to hold the long arm of the lever normally at an angle of about forty-five degrees, more or less, to the horizontal plane of the top of the baling-chamber and upon depressing the long arm of the lever serves to depress the top of the baling-chamber at the discharge end, and thus contract the discharge end to the extent depending upon the movement of the lever.

The bent end or short arm of the lever may be formed of two metal plates N, bolted to the lever, and in the bifurcation formed by the two plates may be and preferably is pivoted a roller O, so that in depressing the lever K there will be a rolling contact between its bent or cam end and the top of the baling-chamber or the part thereof against which the cam end or short arm of the lever bears. We prefer to provide a track for the roller O to move over and for that purpose illustrate in the drawings a metal plate P, secured to the end cross-beam D, which extends across the top of the baling-chamber, said track being preferably inclined or having its rear end elevated, as illustrated, so as to allow a more extended stroke or movement of the lever K as the roller ascends the elevated track in the operation of depressing the long arm of the lever K. The long arm of the lever K is provided with a weight Q, which is adjustable thereon, so as to increase or lessen the pressure exerted by the lever, and which in whatever position the weight may be placed will automatically exert a uniform pressure whether the hay is fed light or heavy and even though there be variations in the condition of the material being fed.

It will be observed that under the construction described when the lever K is in its highest position the discharge end of the baling-chamber is at its maximum expansion and that when the long arm of the lever is depressed its cam end or short arm presses down on the top of the baling-chamber so as to depress the same and contract the discharge end to the extent that the top of the chamber is depressed and that when the degree of compression desired is obtained the weight on the lever is adjusted accordingly and the pressure thus determined upon is exerted against the hay in the baling-chamber, so that a uniform density is given to the bale even though there be variations between a heavy and a light feeding of the material and also variations in the condition of the material being fed. It will also be observed that as the long arm of the lever is depressed the point of the bearing of its cam end or short arm against the top of the chamber is brought more nearly under the pivotal point of the lever to the cross-beam, thereby producing a toggle action whereby a greater leverage is obtained.

In the modification shown in Figs. 3 and 4 the lever K is fulcrumed at the knuckle of its short arm to a link R, which in turn is pivoted to ears S, attached to the cross-beam D, while the end of the short arm is pivotally connected to the cross-beam F by the ears M. When the long arm of the lever H is depressed, the link R is straightened and the fulcrum shifted toward the points of resistance, or, in other words, the short arm and the link are brought more nearly to a straight line in the direction of resistance under a toggle action.

In Figs. 5 and 6 the lever K is fulcrumed at its knuckle to cross-beam D by ears S, and the end of its short bent or curved arm is provided with a roller O, which bears against a metal plate or track P', in this instance secured to the under side of the cross-beam F. When the long arm of the lever K is depressed, the short bent arm of the lever rises and its roller end moves toward the vertical plane of the pivot or fulcrum of the lever, so that increased leverage is obtained.

In Figs. 7 and 8 the lever K is fulcrumed at its knuckle to the cross-beam D by ears S, and the end of its short bent arm is pivotally connected by ears M to the cross-beam F. When the long arm of the lever is depressed, its short arm is raised and the cross-beam F is moved or rocked in the direction of the fulcrum of the lever, thus producing a type of toggle action by which increased leverage is obtained. This rocking motion may be provided for in different ways, and as one means we have illustrated the bolt J, which connects the lower ends of the rods G, as lying in a groove in the under side of a metal block T, the top surface of which is convex and bears against the under side of the lower cross-beam E, so as to allow the rods and cross-beam F at their upper ends to have a rocking movement.

Substantially the same principle of action is involved in all the forms, as it will be observed that when the long arm of the lever is depressed the short bent arm, either at the fulcrum or at the end bearing against the cross-beam F, is moved so as to exert a pressure in the direction of the center of resistance, thereby obtaining increased power or leverage as compression takes place or greater resistance offered, so that the increased resistance is equalized by the increased leverage produced, and thus a greater degree of compression can be obtained with greater ease than if the construction were otherwise.

The operation of the lever is substantially as follows: The more the discharge end of the box is contracted the greater the resistance offered by the side timbers or sills to contraction, and hence the greater the power required to contract the end. This increase in power is given by shifting the fulcrum of the lever or bringing it nearer to the line of resistance as the lever is depressed. Most of this pressure is required for contracting the discharge end of the box, and the excess of pressure above that so required is exerted upon the hay when being fed in the chamber. On the other hand, in proportion as the end of the box is expanded by the pressure of the hay from within to that extent is the pressure to keep the end of the box at its maximum of contraction lessened, and the difference in pressure is exerted upon the hay, and hence as the chamber is expanded and the pressure of the lever diverted more from the line of resistance the weight or pressure of the lever is exerted more upon the hay and less upon the box timbers or sills. In this way the lever automatically adjusts itself to the "full feeding" and the "light feeding" of the hay in the chamber with the end in view of producing uniform density in the bales.

The contracting attachment is composed of few parts, which are simple in their construction and arrangement and admit of easy and quick application to the ordinary construction of hay-presses already in use and also of the easy and quick removal therefrom when desired.

While we have illustrated and described with particularity the preferred details of construction and preferred form of the several parts employed, yet it is obvious from the description that changes can be made therein and essential features of the invention still be employed.

Having described our invention and set forth its merits, what we claim is—

1. The combination with the baling-chamber of a press, of a device for contracting the discharge end of the chamber, said device comprising a swinging lever connected with the discharge end of the chamber and adapted to produce increased leverage as the resistance to contraction of the box increases in the depression of the lever, substantially as described.

2. The combination with the baling-chamber of a press, of a device for contracting the discharge end of the chamber, said device comprising an automatically-acting lever fulcrumed at one end to the discharge end portion of the baling-chamber to exert a compression action on the contractible portion of the chamber, and means connected to said lever between its fulcrum and power-applying end to vary the pressure to be exerted by the lever, substantially as described.

3. The combination with the baling-chamber of a press, of a device for contracting the discharge end of the chamber, said device comprising a swinging bent lever having its short arm connected with the discharge end portion of the chamber and exerting increased leverage thereon as the resistance to the contraction of the box increases in the depression of the lever, and a weight applied to the long arm of the lever, substantially as described.

4. The combination with the baling-chamber of a press, of a device for contracting the discharge end of the baling-chamber, said device comprising a swinging bent lever having its short arm connected with the discharge end portion of the chamber and arranged to exert increased leverage as the resistance to contraction of the box increases in the depression of the lever, substantially as described.

5. The combination with the baling-chamber of a press, of a device for contracting the discharge end of the chamber, said device comprising a cross-beam connected with a part of the baling-chamber and supported above the top of the chamber, an automatically-acting bent lever having its short arm interposed between said cross-beam and the top of the chamber and arranged to exert an upward pressure against said cross-beam and a downward pressure against the top of the chamber beneath said beam to press apart said cross-beam and top of the chamber, and whereby the fulcrum of the lever is brought nearer to the line of resistance as the lever is depressed, and a weight adjustable on said lever, substantially as described.

6. The combination with the baling-chamber of a press, of a device for contracting the discharge end of the baling-chamber, said device comprising a cross-beam connected with a part of the baling-chamber, a swinging lever pivotally connected with said beam and having a part thereof arranged to bear on a part of the contractible top portion of the baling-chamber, and an inclined track at the top of the baling-chamber for a part of the swinging lever to bear against, substantially as described.

In testimony whereof we affix our signatures in presence of two witnesses.

THOMAS EUGENE SIKES.
SIMEON R. SIKES.

Witnesses:
JOHN RAWLINS,
OLIN PHARR.